(12) United States Patent
Priebatsch

(10) Patent No.: US 9,560,041 B2
(45) Date of Patent: *Jan. 31, 2017

(54) AUTHENTICATED REMOTE PIN UNBLOCK

(71) Applicant: Assa Abloy AB, Stockholm (SE)

(72) Inventor: Mark Herbert Priebatsch, Ringwood (AU)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,807

(22) Filed: Jul. 16, 2015

(65) Prior Publication Data

US 2016/0044027 A1 Feb. 11, 2016

Related U.S. Application Data

(63) Continuation of application No. 13/922,582, filed on Jun. 20, 2013, now Pat. No. 9,118,668, which is a
(Continued)

(51) Int. Cl.
| | |
|---|---|
| *H04L 29/06* | (2006.01) |
| *G06F 21/31* | (2013.01) |
| *G06F 21/34* | (2013.01) |

(52) U.S. Cl.
CPC ......... *H04L 63/0853* (2013.01); *G06F 21/31* (2013.01); *G06F 21/34* (2013.01); *G06F 2221/2131* (2013.01)

(58) Field of Classification Search
CPC ........ G06F 21/305; G06F 21/31; G06F 21/34; G07F 7/1008; H04L 63/061; H04L 63/0853; G06Q 20/341
(Continued)

(56) References Cited

U.S. PATENT DOCUMENTS

| | | | | |
|---|---|---|---|---|
| 5,719,941 A | * | 2/1998 | Swift | G06F 21/31 340/5.54 |
| 5,768,373 A | * | 6/1998 | Lohstroh | G06F 21/31 380/286 |

(Continued)

FOREIGN PATENT DOCUMENTS

| | | | | |
|---|---|---|---|---|
| EP | 1111495 | * | 6/2001 | G06F 1/00 |
| WO | WO00/16190 | * | 3/2000 | G06F 7/00 |

OTHER PUBLICATIONS

RSA Laboratories, "PKCS #1v2.1: RSA Cryptography Standard", Jun. 14, 2002, pp. 1-61.*
European Search Report Mar. 8, 2004, pp. 1-3.*

*Primary Examiner* — Kambiz Zand
*Assistant Examiner* — Tongoc Tran
(74) *Attorney, Agent, or Firm* — Muirhead and Saturnelli, LLC

(57) ABSTRACT

This invention provides a simple and secure PIN unblock mechanism for use with a security token. A set of one or more passphrases are stored on a remote server during personalization. Likewise, the answers to the passphrases are hashed and stored inside the security token for future comparison. A local client program provides the user input and display dialogs and ensures a secure communications channel is provided before passphrases are retrieved from the remote server. Retrieval of passphrases and an administrative unblock secret from the remote server are accomplished using a unique identifier associated with the security token, typically the token's serial number. A PIN unblock applet provides the administrative mechanism to unblock the security token upon receipt of an administrative unblock shared secret. The remote server releases the administrative unblock shared secret only after a non-forgeable confirmatory message is received from the security token that the user has been properly authenticated. The administrative unblock shared secret is encrypted with the token's public key during transport to maximize security.

26 Claims, 14 Drawing Sheets

Related U.S. Application Data continuation of application No. 11/834,560, filed on Aug. 6, 2007, now Pat. No. 8,495,381, which is a continuation of application No. 10/305,179, filed on Nov. 27, 2002, now abandoned.

(58) Field of Classification Search
USPC .................................................. 713/172
See application file for complete search history.

(56) References Cited

U.S. PATENT DOCUMENTS

| | | | | |
|---|---|---|---|---|
| 5,953,422 A * | 9/1999 | Angelo | ............ | G06F 21/34 713/185 |
| 5,991,882 A * | 11/1999 | O'Connell | ............ | G06F 21/31 726/18 |
| 6,216,229 B1 * | 4/2001 | Fischer | ............ | G06F 12/1408 380/277 |
| 6,360,092 B1 * | 3/2002 | Carrara | ............ | H04W 12/08 455/410 |
| 6,360,322 B1 * | 3/2002 | Grawrock | ............ | G06F 21/31 380/255 |
| 8,444,764 B2 * | 5/2013 | Winkler | ............ | C04B 40/0039 106/129.1 |
| 8,639,940 B2 * | 1/2014 | Lord | ............ | G06F 21/77 380/277 |
| 9,247,425 B2 * | 1/2016 | Nousiainen | ......... | H04L 63/0853 |
| 2002/0018570 A1 * | 2/2002 | Hansmann | ............ | H04L 9/3226 380/270 |
| 2003/0037259 A1 * | 2/2003 | Koistinen | ............ | G06F 21/606 726/12 |
| 2006/0288407 A1 * | 12/2006 | Naslund | ............ | H04L 9/0844 726/9 |

* cited by examiner

AUTHENTICATED REMOTE PIN UNBLOCK

RELATED APPLICATIONS

This application is a continuation of U.S. application Ser. No. 13/922,582 filed Jun. 20, 2013 (pending) which is a continuation of U.S. application Ser. No. 11/834,560 filed Aug. 6, 2007 (U.S. Pat. No. 8,495,381) which is a continuation of U.S. application Ser. No. 10/305,179 filed Nov. 27, 2002 (now Abandoned), which are hereby incorporated by reference.

FIELD OF INVENTION

The present invention relates generally to a data processing system and method and more specifically to a data processing system and method for unblocking a security token by an authenticated user.

BACKGROUND

A security token is used to store an entity, for example a user's digital identity. The digital identity has many uses, such as building access, signing of emails, access to computer systems and obtaining monetary trust. The inherent security mechanism that protects a user's digital identity from being used fraudulently is a combination of security token characteristics and a Personal Identification Number (PIN) known only to the user. The PIN is usually a four digit number which is used to authenticate the user to the security token. Successful authentication of the user to the security token allows the user access to the resources and data contained in or available using the security token.

The use of a four digit number has an inherent weakness in today's E-commerce environment. A four digit number has only ten thousand possible combinations. As such, access to a lost or stolen security token could easily be accomplished by entry of random PIN combinations until the correct PIN is determined. To address this inherent weakness, a security mechanism is generally incorporated into the security token which counts the number of sequential incorrect PIN entries and blocks the security token from further access after a predetermined number of sequential incorrect PIN entries has occurred. This is the situation in which the security mechanism is designed to protect against.

The security mechanism, while simple to implement and reasonably effective may inadvertently block out an authorized user due to common keyboarding problems such as a stuck key, incorrectly replaced key cover or difficulty in determining when a keyboard entry has occurred. Another increasingly common problem, a user will have memorized several PINs for various service providers which lends itself to entry of incorrect PINs. Once blocked, the only way that a user can revive access to his or her security token is to have the security mechanism reset by an appropriate support organization.

This becomes problematic in large organizations as the time and effort to reset the security mechanism usually involves physical presentation of the security token by the user to the support organization. The physical presentation requirement allows the support organization to visually identify the authorized user and maintains close control over post issuance security token management. As is apparent, this process negatively impacts the productivity of both the user and the support organization and increases overall administrative costs to the organization.

Alternatives to physical presentation of the security token include the use of a telephone support call center. An example of which is disclosed in U.S. Pat. No. 6,360,092 to Carrarra. The '092 patent requires a user to telephone a maintenance center to telemetrically reset the security mechanism in the token. This method alleviates the physical presentation requirement but does not significantly reduce the productivity loss to the user and the support organization.

Thus, it would be highly advantageous to provide a mechanism which allows an authenticated user to unblock their own security token, while ensuring that the user initiated unblocking procedure is securely performed to prevent fraudulent unblocking or otherwise compromising the resources or data contained in or available using the security token.

SUMMARY

This invention addresses the limitations described above and provides a secure mechanism to allow an authenticated user to securely unblock his or her security token. This invention provides the advantages of utilizing normally existing cryptographic and administrative mechanisms to unblock a security token without having to physically identify the end user or require the assistance of a third party and end-to-end security is maintained throughout the PIN reset process using the existing cryptographic and administrative mechanisms.

The PIN unblock mechanism utilizes responses to one or more passphrases which must be correctly answered before an administrator level PIN reset mechanism is performed. The initial answers to the passphrases are entered during the security token's personalization stage, hashed using a one-way message digest function and stored inside the security token in a manner not directly accessible via external processes.

To practice this invention, a token PIN unblock applet is installed in the security token and associated with the token's security executive. The token PIN unblock applet is the only token based applet that a user can successfully initiate after the security token has been locked due to sequential incorrect PIN entries.

The unblock applet includes the ability to compare the hashed passphrase results to the existing hashed passphrase answers, securely signal the remote server that the passphrases have been correctly answered, securely access cryptographic functions, receive and utilize administrator PIN unblock secrets and perform replacement of the locked user PIN with a new and unblocked user PIN after the security token is unblocked by the remote server. The token PIN unblock applet is written in such a way that it will never return either a cryptographic key or any decrypted data.

A client PIN unblock application is installed in the user's desktop computer system, preferably as a downloadable browser application, which allows the user to initiate the PIN unblock applet installed in the security token. If the desktop computer system lacks the required client PIN unblock application, the user will need to download the application from a secure website. The client PIN unblock application provides the user interface dialogs, securely stores user inputs, causes a secure communications session to be generated between the desktop computer system, requests retrieval of the set of passphrases from a remote server and securely passes the hashed results to the passphrases and the administrator PIN unblock secrets to the token unblock applet.

The remote server housing the passphrases includes a server PIN unblock service which retrieves the proper passphrases associated with the security token, provides the unblocking secret to the token PIN unblock applet following receipt of the signal from the token that the passphrases have been correctly answered and generates an audit trail of the PIN unblock transactions. The stored passphrases and unblock secrets are retrieved from the remote server using a unique identifier associated with the security token.

All communications between the client and the server are performed using a secure messaging protocol preferably Psec. Mutual authentication is preferred and utilizes PKI credentials provided by a digital certificate contained in the security token and a separate digital certificated received from the server. The use of mutual authentication provides the additional advantage of preventing denial of service attacks (DoS.)

All unblock secrets sent from the server PIN unblock service are encrypted with the token's public key obtained from the digital certificate received during mutual authentication.

The term "security token" as defined herein refers to hardware based security devices such as smart cards, integrated circuit cards, subscriber identification modules (SIM), wireless identification modules (WIM), identification tokens, secure application modules (SAM), hardware security modules (HSM), secure multi-media card (SMMC) and like devices.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the trite scope and spirit of the subject invention as defined in the claims.

DETAILED DESCRIPTION

This invention provides a simple and secure PIN unblock mechanism for use with a security token. A set of one or more passphrases which must be answered correctly before an administrative PIN unblock secret is passed to the security token. The initial answers to the passphrases are entered during the security token's personalization stage, hashed using a one-way message digest function and stored inside the security token in a manner not directly accessible via external processes.

Figure 1:
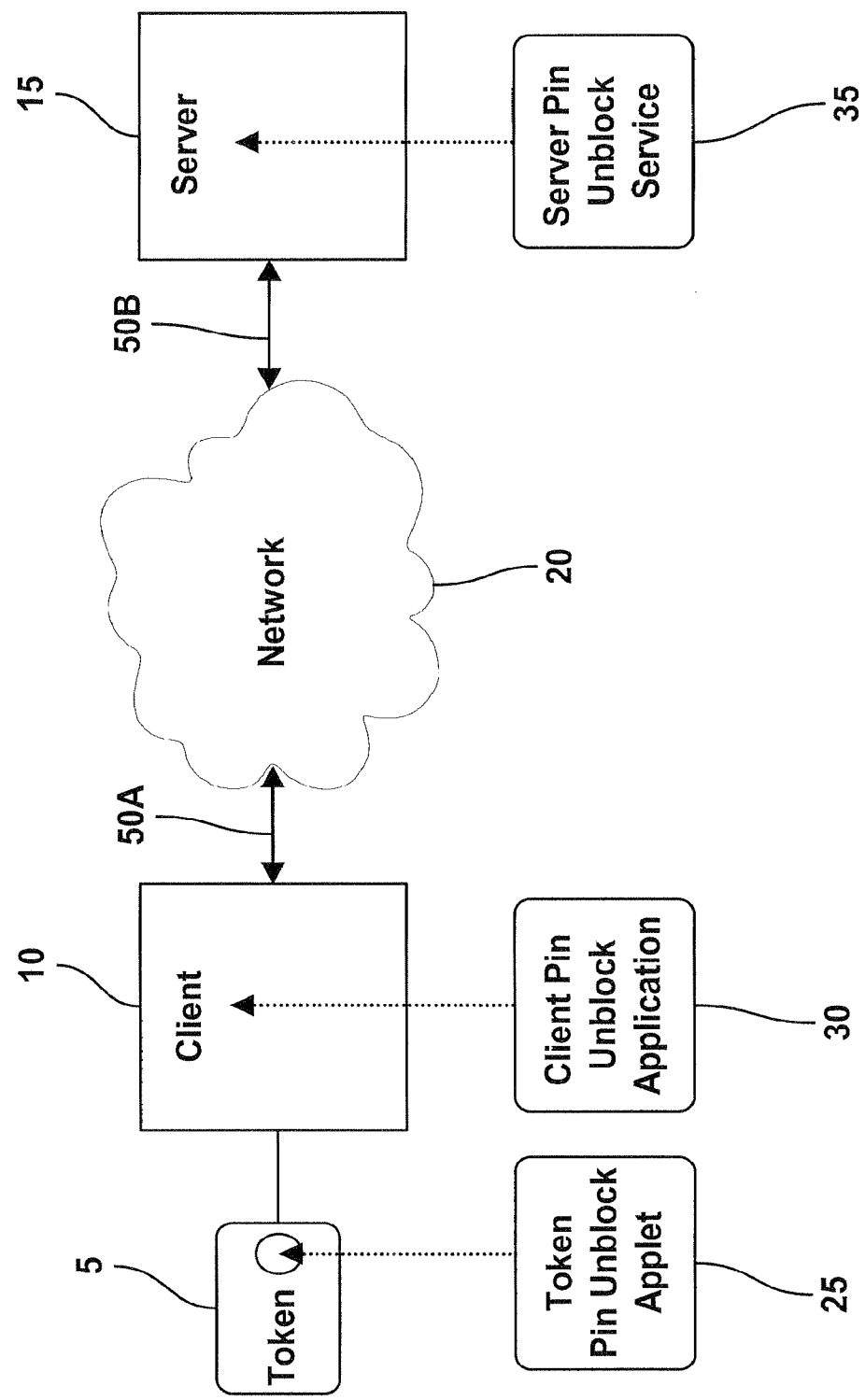
FIG. 1 is a general block diagram illustrating the major components and general arrangement of the invention.

Referring to FIG. 1, a security token 5 is shown functionally connected to a local client 10. The security token includes an a token PIN unblock applet 25 which performs the actual PIN unblock functions based on parameters passed from a client PIN unblock application 30 operatively installed in the local client.

The local client 10 operatively connected 50A to a telecommunications network 20 using a secure messaging protocol. In the preferred embodiment of the invention, IPsec is employed. Other secure messaging protocols such as secure socket layer (SSL) encryption, secure shell encryption (SSH) or transport layer security (TLS) may be implemented as well. The client PIN unblock application 30 provides user interface dialogs and passes messages between the token PIN unblock applet 25 and a server PIN unblock service installed on a remote server 15.

The client PIN unblock application 30 is preferably a downloadable browser application or applet, which allows the user to initiate the PIN unblock applet 25 installed in the security token 5. If the client 10 lacks the required client PIN unblock application 30, the user may download the application from a secure website. The universal resource locator (URL) is usually printed on the back of the security token 5 or is otherwise known to the end user.

The remote server 15 is shown operatively connected 50B to the network 20 and in processing communications with the local client 10 using the secure messaging protocol. The remote server 15 includes the server PIN unblock service 35. The server PIN unblock service 35 retrieves the applicable passphrases and an administrative unblock secret using parameters supplied or generated by the token PIN unblock applet 25.

Figure 1A:
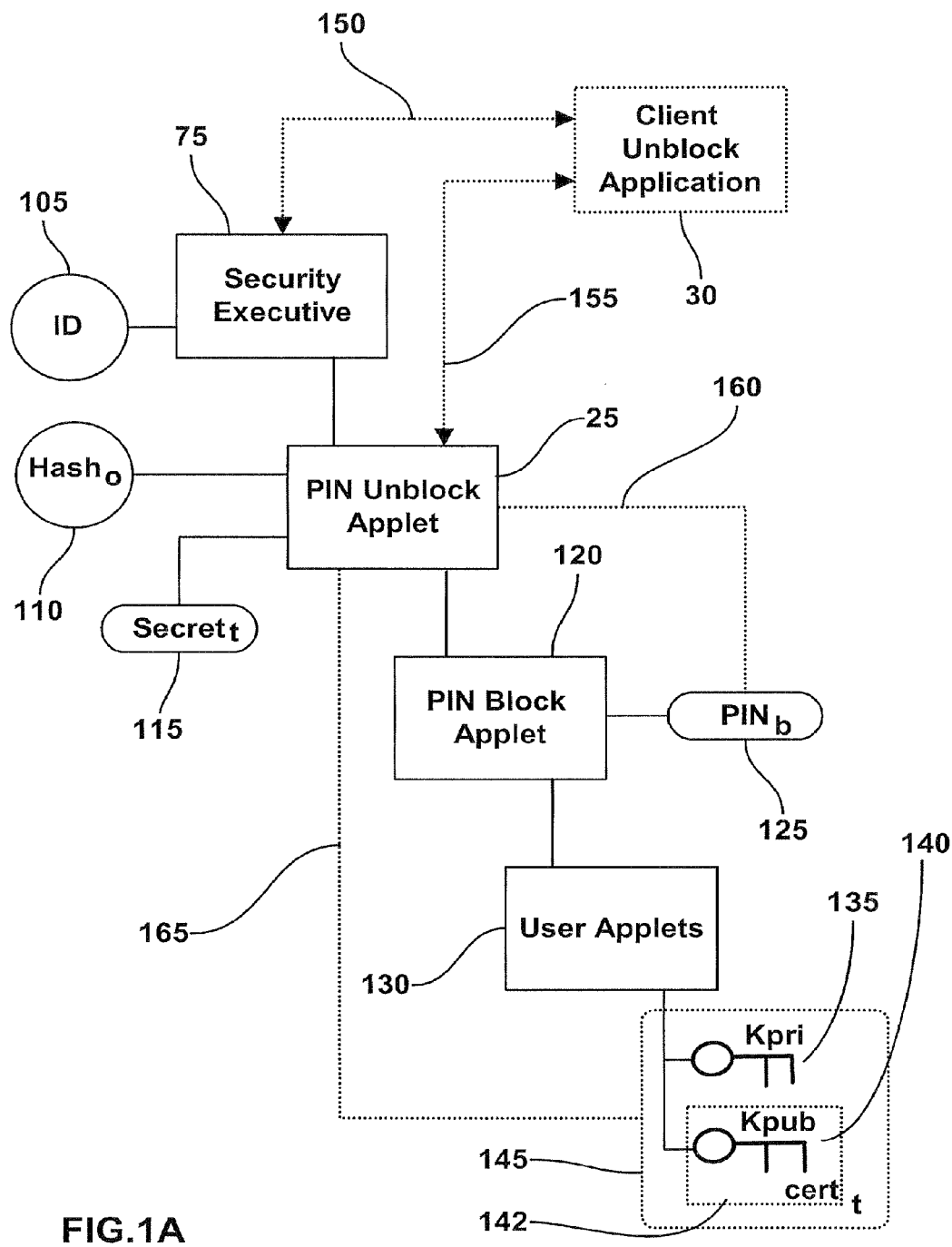
FIG. 1A is a detailed block diagram illustrating the arrangement of the PIN unblock applet included in a security token.

In FIG. 1A the token PIN unblock applet 25 is shown associated with the token's security executive 75. The user security executive 75 provides symmetric and asymmetric cryptographic services, random number generation, authentication challenge generation and comparator functions when requested by the PIN unblock applet 25.

The security executive 75 includes the ability to pass 150 a unique identifier ID 105 to external resources. The unique identifier 105 may be an internally masked token serial number or another obfuscated identifier unique to the security token.

The token PIN unblock applet 25 communicates 155 with the client unblock application 30 and is the only token based applet that a user can successfully initiate after the security token has been blocked due to sequential incorrect PIN entries. A one-way message digest Hash 110 of the original answers to the set of passphrases is stored inside the security token and associated with the PIN unblock applet 25. The PIN unblock applet 25 includes the ability to compare the reference one-way message digest $Hash_o$ 110 passphrase against a later hashed passphrase result passed to the applet by the client unblock application 30. The one-way message digest preferably uses SHA-1, however, other common message digest functions such as MD-5 may be used as well so long as consistency is maintained between the digest function used to create the reference hash and the subsequent response hash.

An administrative shared secret $Secret_t$ 115 is used to unblock an existing PIN block applet 120. The counterpart shared secret is securely stored on the remote server and is only passed to the PIN unblock applet 25 after a user has correctly entered the proper passphrases and the resulting hash verified against the reference hash $Hash_o$ 110. The token PIN unblock applet 25 provides an encrypted message which is passed to the remote PIN unblock service which signaling successful user authentication. The successful verification of the encrypted message by the remote PIN unblock service causes the administrative counterpart shared secret to be securely sent to the PIN unblock applet 25. This mechanism is discussed in more detail in the discussion that follows herein.

The administrative shared secret may be a symmetric cryptographic key or an administrative PIN. The PIN block applet 120 monitors the number of sequential incorrect PIN entries and prevents access to end user applets 130 and cryptographic keys 145 when the user's PIN $PIN_b$ 125 has become been blocked. The token PIN unblock applet 25 includes the functionality to replace 160 the blocked PIN $PIN_b$ 125 following successful unblocking of the PIN block applet 120. A security mechanism is incorporated into the token PIN unblock applet 25, which after a predefined number of sequential and unsuccessful attempts to unblock the user's PIN results, in the security token becoming unrecoverable by the end user.

The token PIN unblock applet 25 may access 165 the user's public and private cryptographic keys Kpri 135, Kpub 140 and with the exception of the user's digital certificate $cert_t$ 142 containing the user's public key Kpub 140, is prohibited by the security executive 75 from exporting any cryptographic keys or PIN data. Operations involving the token's private key Kpri 135 PIN are tightly controlled to limit its use to only those operations necessary to support the token PIN unblock applet 25. The public key infrastructure (PKI) keys in the preferred embodiment of the invention are intended to utilize 1,024 bit RSA keys but may include pretty good privacy (PGP), Diffie-Helman (DH) or elliptical curve cryptography (ECC).

Figure 1B:
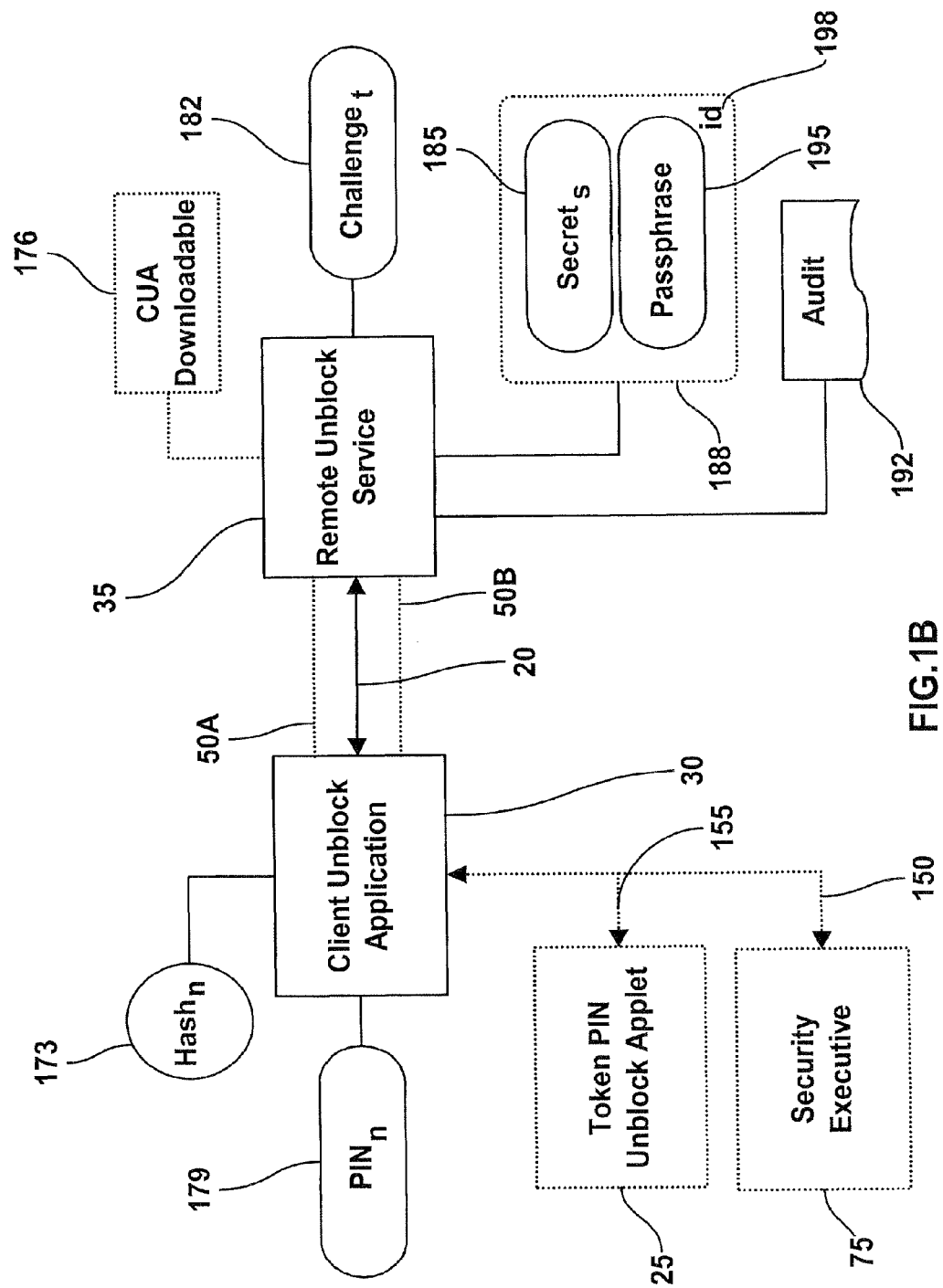
FIG. 1B is a detailed block diagram illustrating the arrangement of the client unblock application included in the local client and its interrelationship with the remote unblocked service included in the remote server.

Referring to FIG. 1B, the client PIN unblock application 30 is installed in the user's desktop and provides the user display and input dialogs for entry of a replacement PIN $PIN_n$ 179 and displays the set of passphrases 195 retrieved from the remote server by the remote unblock service 35. If the client 10 lacks the required client PIN unblock application 30, a copy CUA (Common User Access) downloadable 176 may retrieved from the remote server as previously described.

Figure 2:
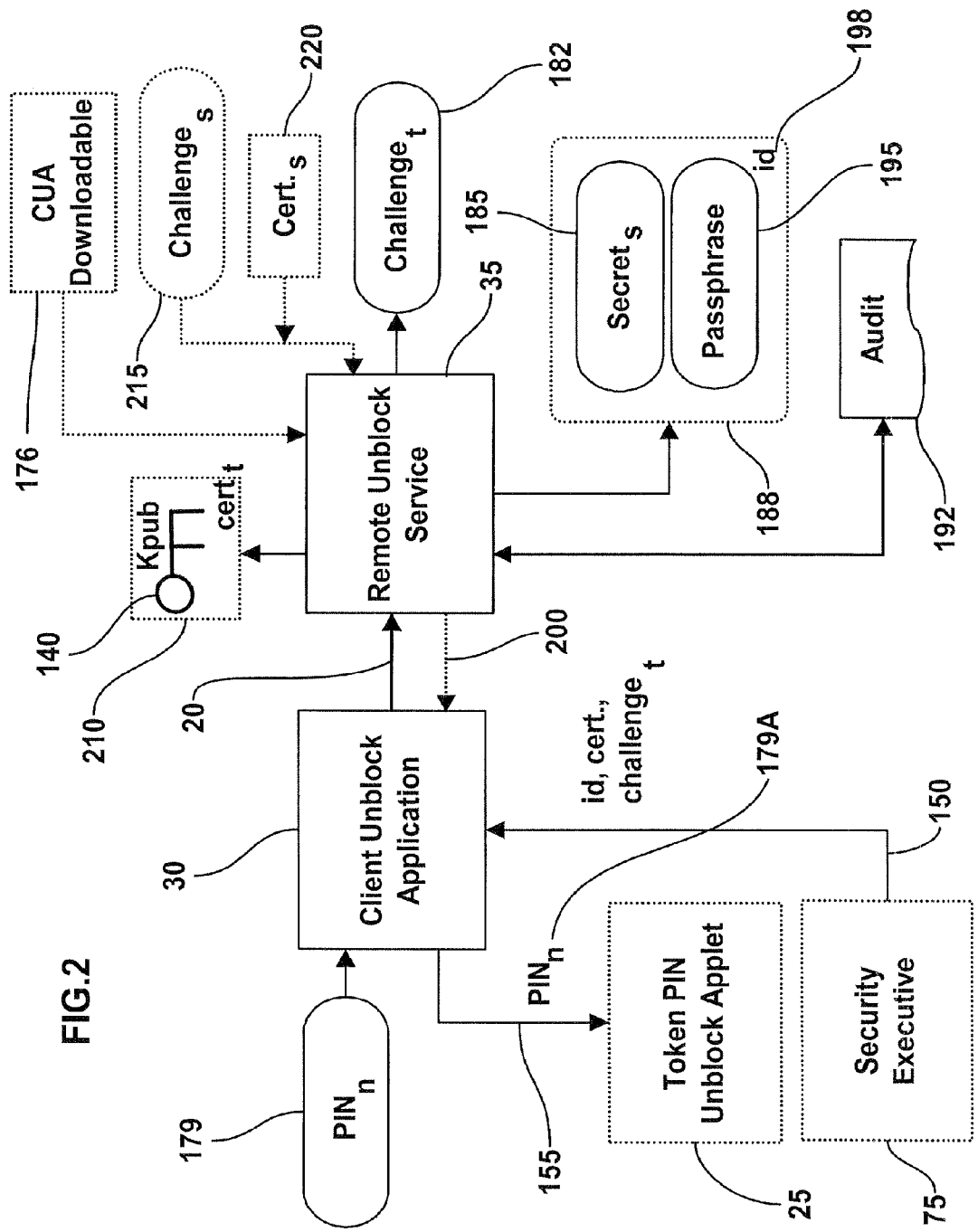
FIG. 2 is a detailed block diagram illustrating the initiation of a security token PIN unblock process at the local client where an initial set of parameters is passed from the local client to the remote server.

Referring to FIG. 2, once the client unblock application 30 is initiated, the user is prompted to enter a replacement PIN $PIN_n$ 179 which is securely passed 155 to the token unblock applet 25. Concurrently, an authentication challenge $Challenge_t$ 182 is generated by the token's security executive 75 and passed 150 along with the token's unique identifier 198 and digital certificate $cert_t$ 210 via the client unblock application 30 to 20 the remote unblock service 35. The remote unblock service temporarily stores the initial challenge $Challenge_t$ 182 and the token's digital certificate $cert_t$ 210 for future use. In alternate embodiment of the invention, mutual authentications are performed between the client unblock application 30 and the remote unblock service 35 by sending 200 a server based challenge $Challenge_s$ 215 and digital certificate $Cert_s$ 220 to the client unblock application 30. Both digital certificates certificate $cert_t$ 210 and $Cert_s$ 220 conform to X.509 standards.

Figure 3:
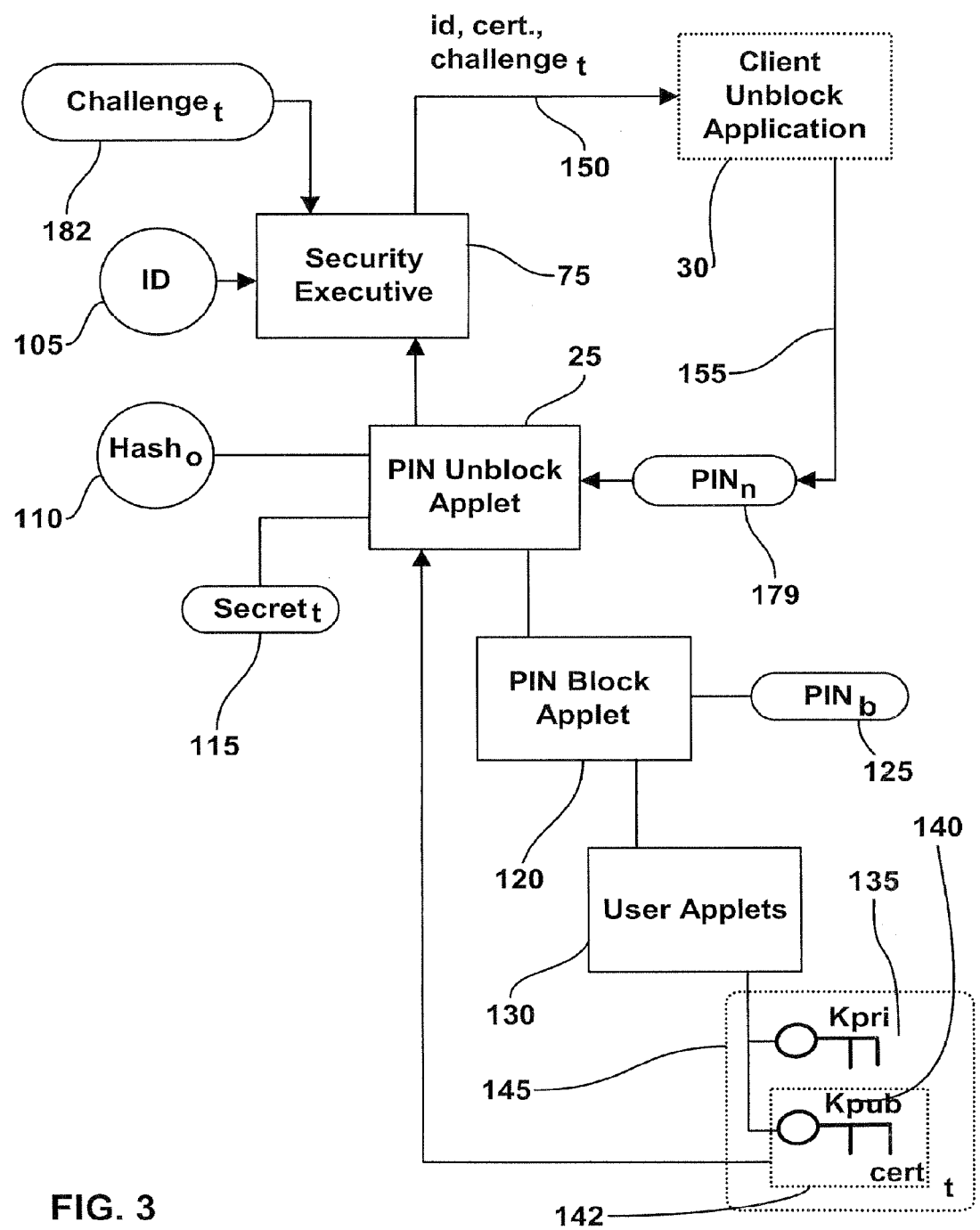
FIG. 3 is a detailed block diagram illustrating the initiation of a security token PIN unblock process inside the security token where the initial set of parameters is generated by the security token and passed to the client unblock application.

Referring to FIG. 3, the incoming 155 replacement PIN $PIN_n$ 179 passed by the client unblock application 30 is shown being temporarily stored by the token unblock applet 25. The challenge $Challenge_t$ 182 is generated by the security executive 75 and passed along with the user's digital certificate $cert_t$ 142 and unique identifier 105 to the client unblock applet 30 as described above.

Figure 4:
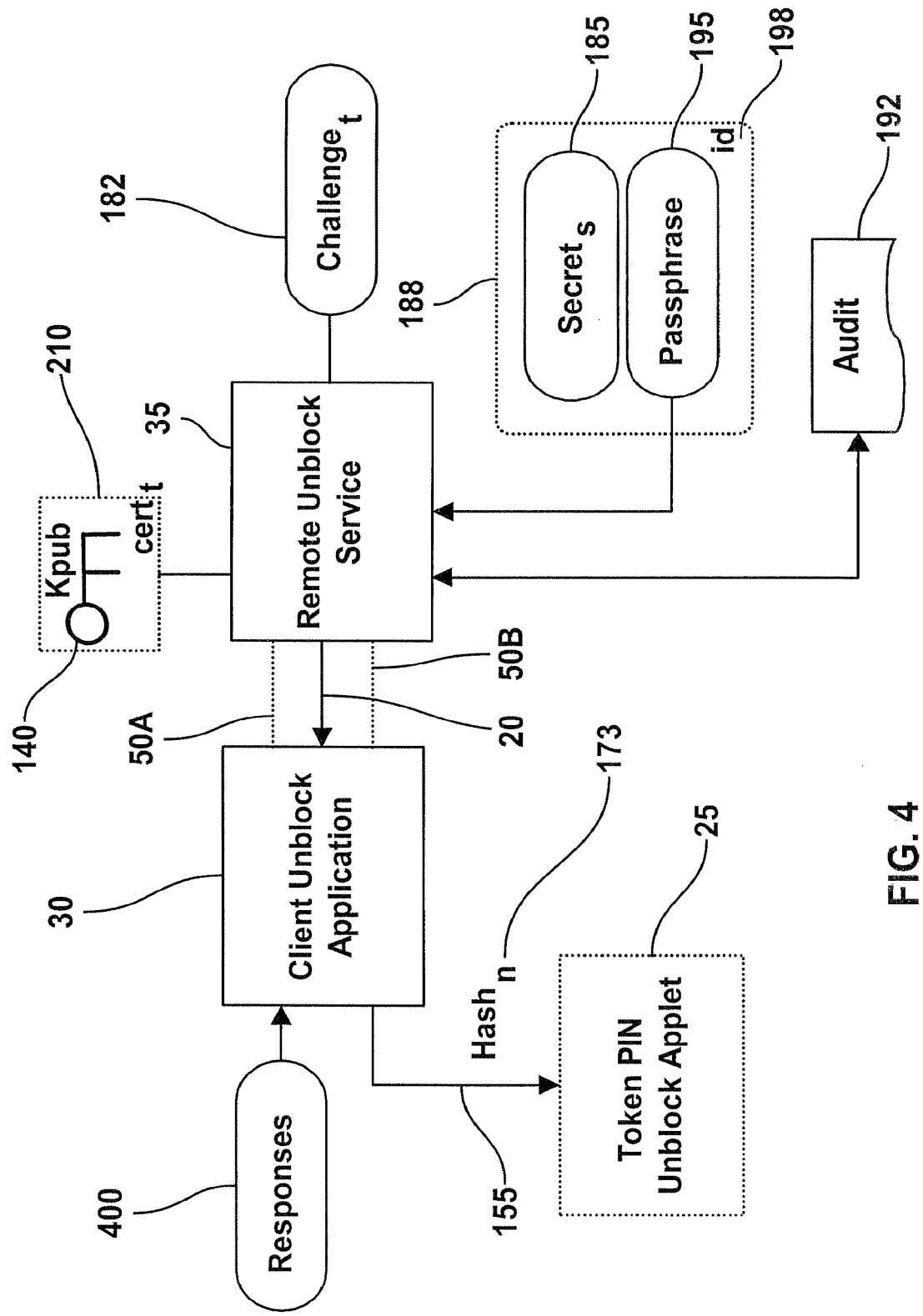
FIG. 4 is a detailed block diagram illustrating the continuation of the PIN unblock process between the remote server and the local client where a passphrase is retrieved by the remote server using one of the parameters passed by the client unblock application.

In FIG. 4, a secure communications session is established 50A, 50B between the client unblock application 30 and the remote unblock service 35 based on the latter authentication. The remote unblock service 35 retrieves the stored set of passphrases 195 using the token's unique identifier id 198 as a lookup reference. The passphrases 195 and counterpart administrative secret $Secret_s$ 185 were originally stored in a record 188 associated with the token's unique identifier id 198 at the time the security token was personalized.

In an alternative embodiment of the invention, the contents of the record 188 is separately encrypted with the user's public key. The remote unblock service generates an audit trail 192 of the PIN unblock transactions. The retrieved passphrases 195 are securely passed 20 to the client unblock application 173 where the user is prompted to enter responses 400 to the passphrases 195. The user responses 400 are then hashed $Hash_n$ 173 by the client unblock application 30 and securely passed 155 to the token unblock applet 25.

Figure 5:
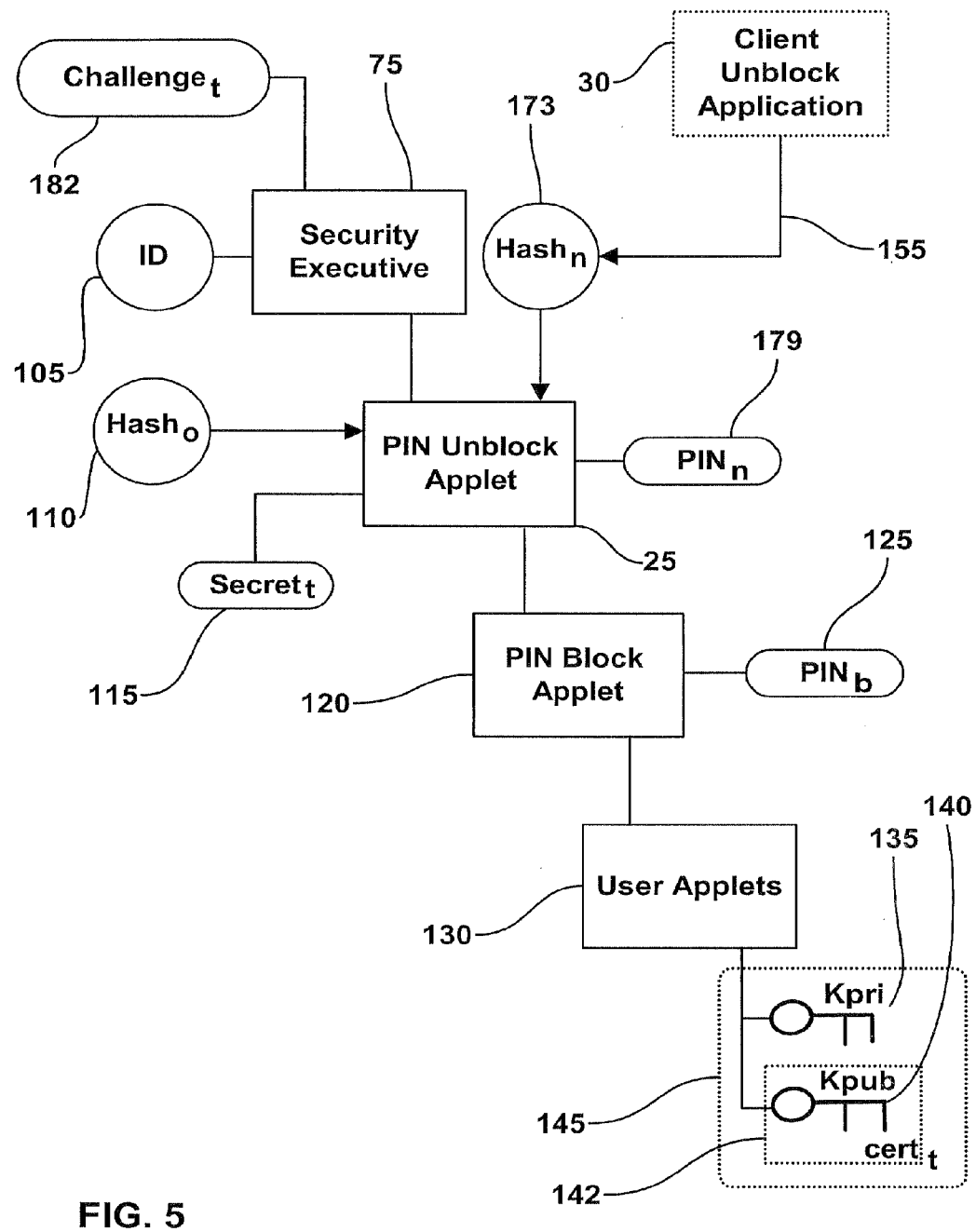
FIG. 5 is a detailed block diagram illustrating the continuation of the PIN unblock process between the local client and the security token where a hash of answers is received from the client unblock application.

Referring to FIG. 5, the incoming hashed user responses $Hash_n$ 173 passed 155 from the client unblock application 30 are received by the token unblock applet 25 and compared to the reference hash $Hash_o$ 110. If the incoming hash $Hash_n$ 173 does not match the reference hash $Hash_o$ 110, the user is alerted that the PIN unblock process has failed by the client unblock application 30 (not shown.) The aforementioned security mechanism incorporated into the token PIN unblock applet 25 prevents excessive multiple attempts at unblocking the security token. No other messages are provided which prevents a sophisticated hacker from attempting to determine where in the process the failure has occurred.

Figure 6:
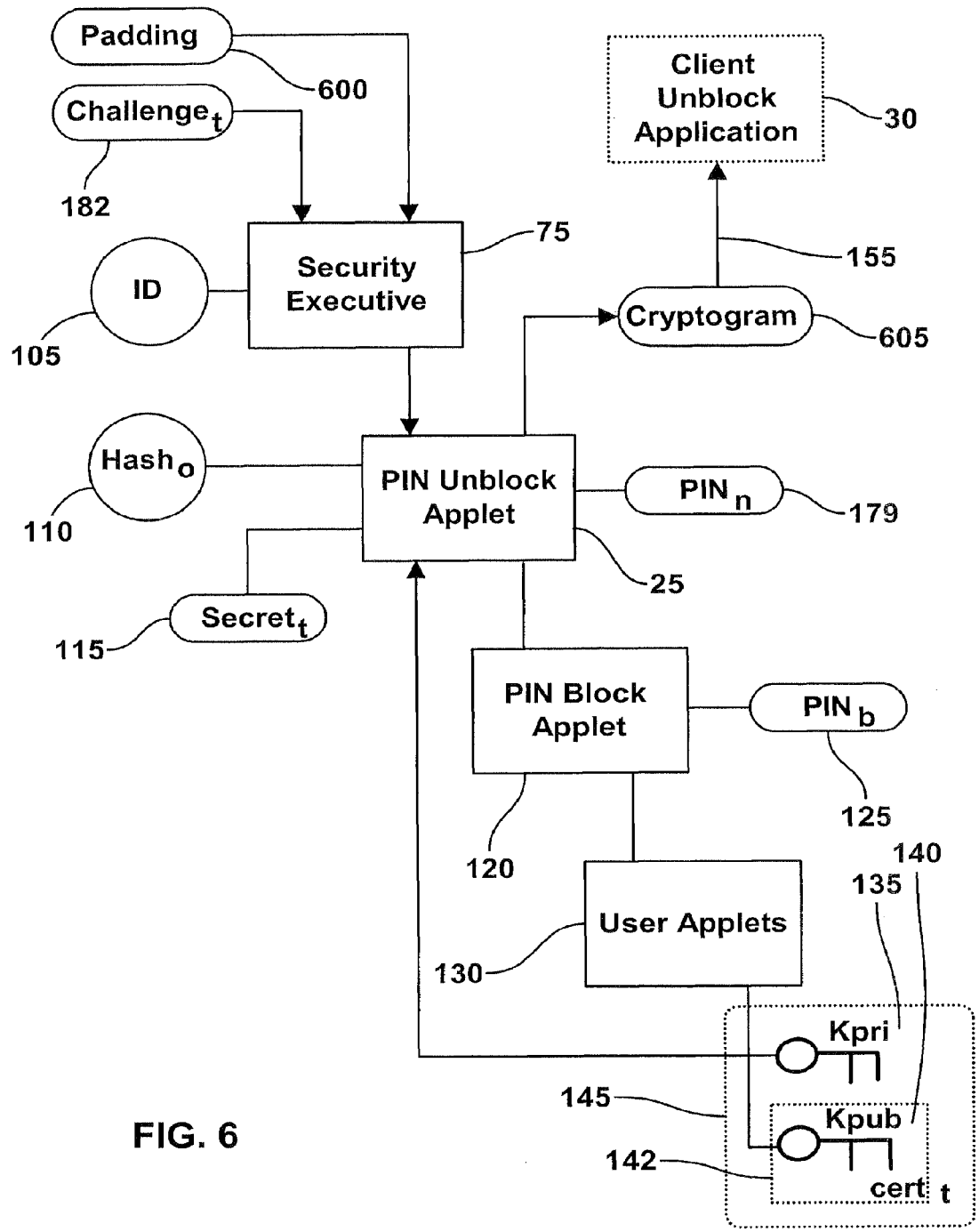
FIG. 6 is a detailed block diagram illustrating the continuation of the PIN unblock process where an initial challenge is padded, encrypted using a private key forming a cryptogram and passed to the client unblock application.

In FIG. 6, a successful match between the user response Hash$_n$ 173 and the reference hash Hash$_o$ 110 results in a cryptogram 605 to be generated. The cryptogram is comprised of the original challenge Challenge$_t$ 182 and padding 600 which is encrypted by the token PIN unblock applet 25 using the private key Kpri 135. The cryptogram is then passed 155 to the client unblock application 30. The random padding 600 is generated by the security executive 75 preferably in accordance with public key cryptographic system (PKCS) #1 specifications. Padding is employed in the preferred embodiment of the invention to prevent surreptitious capture after receipt by the client, which is particularly advantageous when using an uncontrolled client. The cryptogram will be used by the remote PIN unblock service as a signal that the user has been successfully authenticated.

Figure 7:
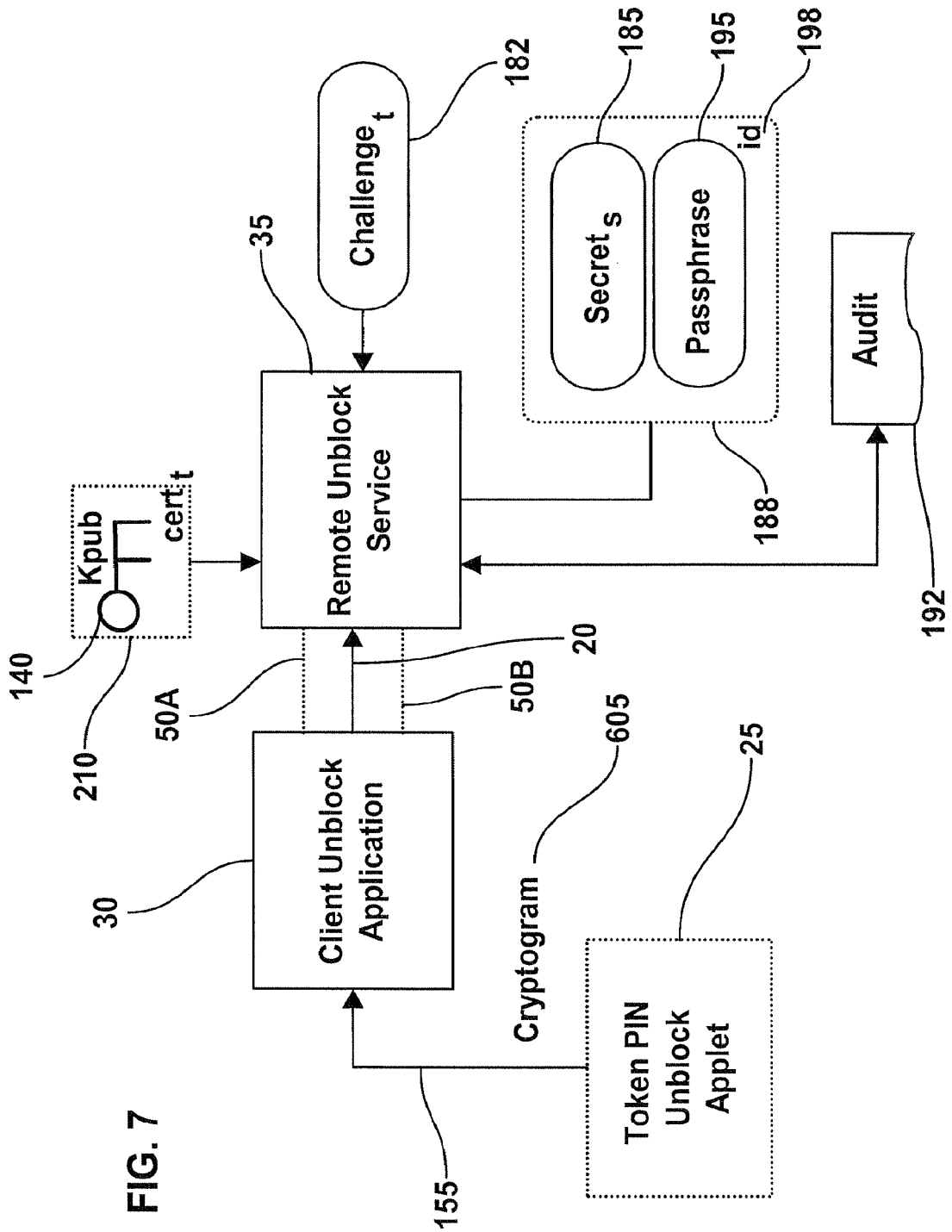
FIG. 7 is a detailed block diagram illustrating the continuation of the PIN unblock process between the local client and the remote server where the cryptogram containing a padded challenge is returned to the remote server and verified.

In FIG. 7, the cryptogram 605 is received 155 by the client unblock application and passed 20 using the secure messaging protocol 50A, 50B to the remote unblock service 35. The remote unblock service 35 decrypts the cryptogram using the public key Kpub 140 counterpart contained in the previously received digital certificate cert$_t$ 210.

The remote unblock service 35 then compares the decrypted result to the original challenge Challenge$_t$ 182 while ignoring the extraneous padding. If the decrypted challenge does not match the original challenge Challenge$_t$ 182, the unblock process ends. As before, no other messages are provided. As before, the remote unblock service generates an audit trail 192 of the PIN unblock transactions.

Figure 8:
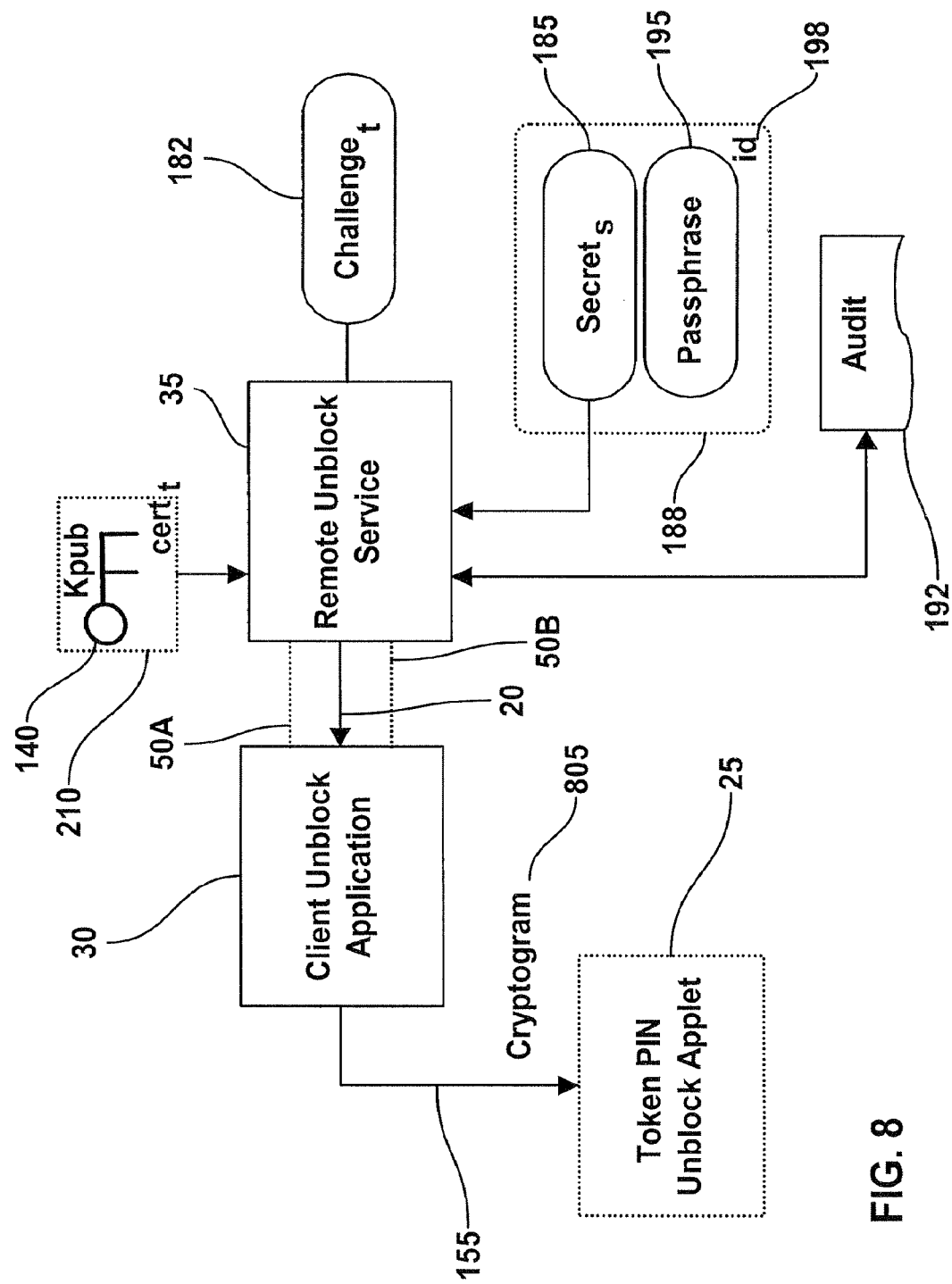
FIG. 8 is a detailed block diagram illustrating the continuation of the PIN unblock process between the remote server and the local client where a cryptogram containing a PIN unblock secret is returned to the local client and passed to the security token.

In FIG. 8, if the decrypted challenge does match the original challenge Challenge$_t$ 182, the remote unblock service 35 retrieves the counterpart administrative secret Secret$_s$ 185 using the token's unique identifier as a lookup reference. The retrieved administrative secret Secret$_s$ 185 is then encrypted using the public key Kpub 140. The resulting cryptogram 805 is then passed 20 using the secure messaging protocol 50A, 50B to the client unblock application 30. The client unblock application 30 securely and transparently passes 155 the cryptogram 805 to the token unblock applet 25.

Figure 9:
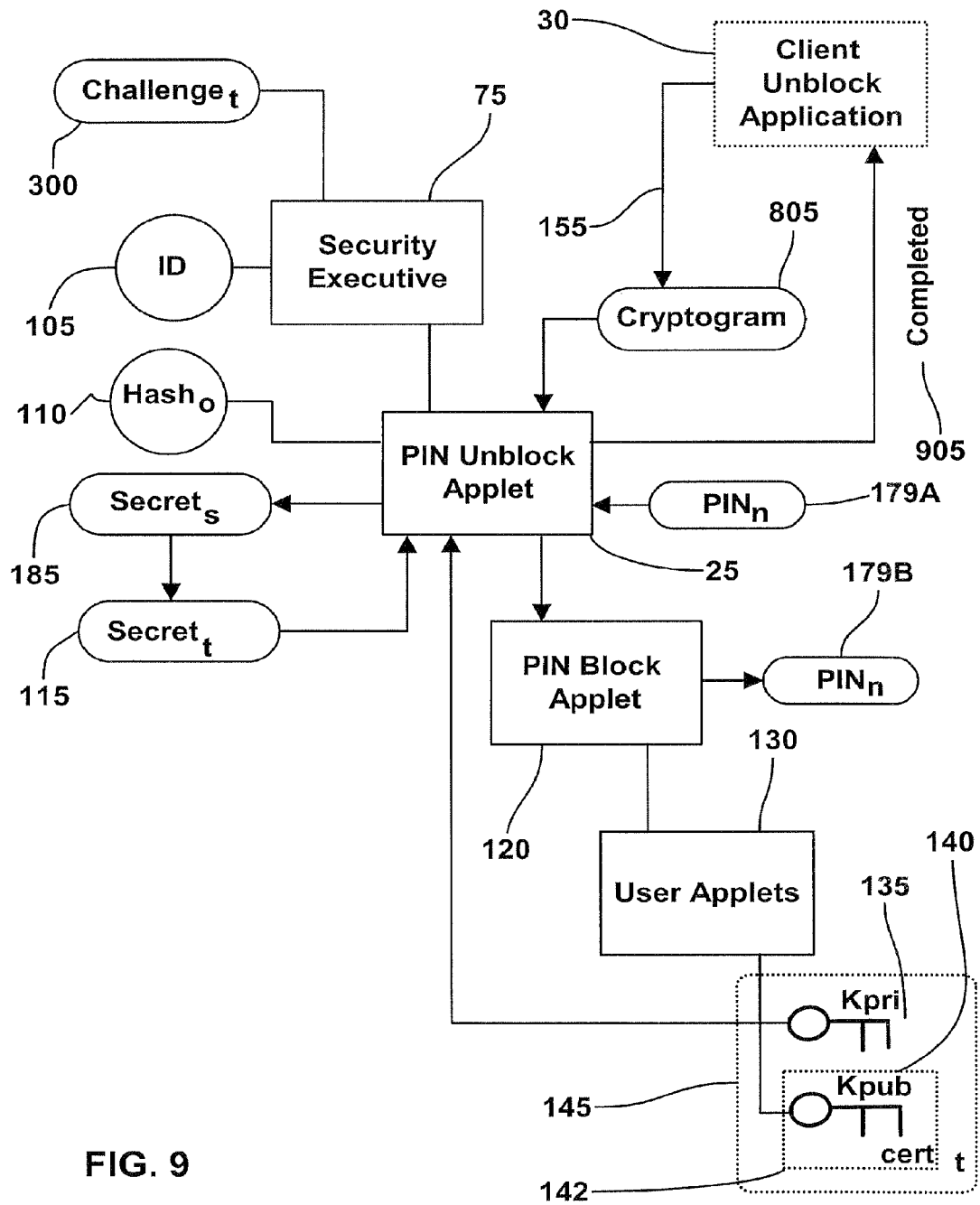
FIG. 9 is a detailed block diagram illustrating the continuation of the PIN unblock process between the security token and the local client where the cryptogram containing the PIN unblock secret is decrypted and used to unblock the security token. An affirmative response is passed from the security token to the local client for routing to the remote server.

Referring to FIG. 9, cryptogram 805 is received 155 by the token unblock applet 25 and decrypted using the private key Kpri 135. The resulting administrative secret Secret$_s$ 185 is used in combination with the token shared secret Secret$_t$ 115 to unblock the PIN block applet 120. The replacement PIN n 179A is then operatively installed as the active user PIN n 179B. After the unblocking process has successfully completed, a completion message 905 is generated by the token unblock applet 25 which is passed 155 to the client unblock application 30.

Figure 10:
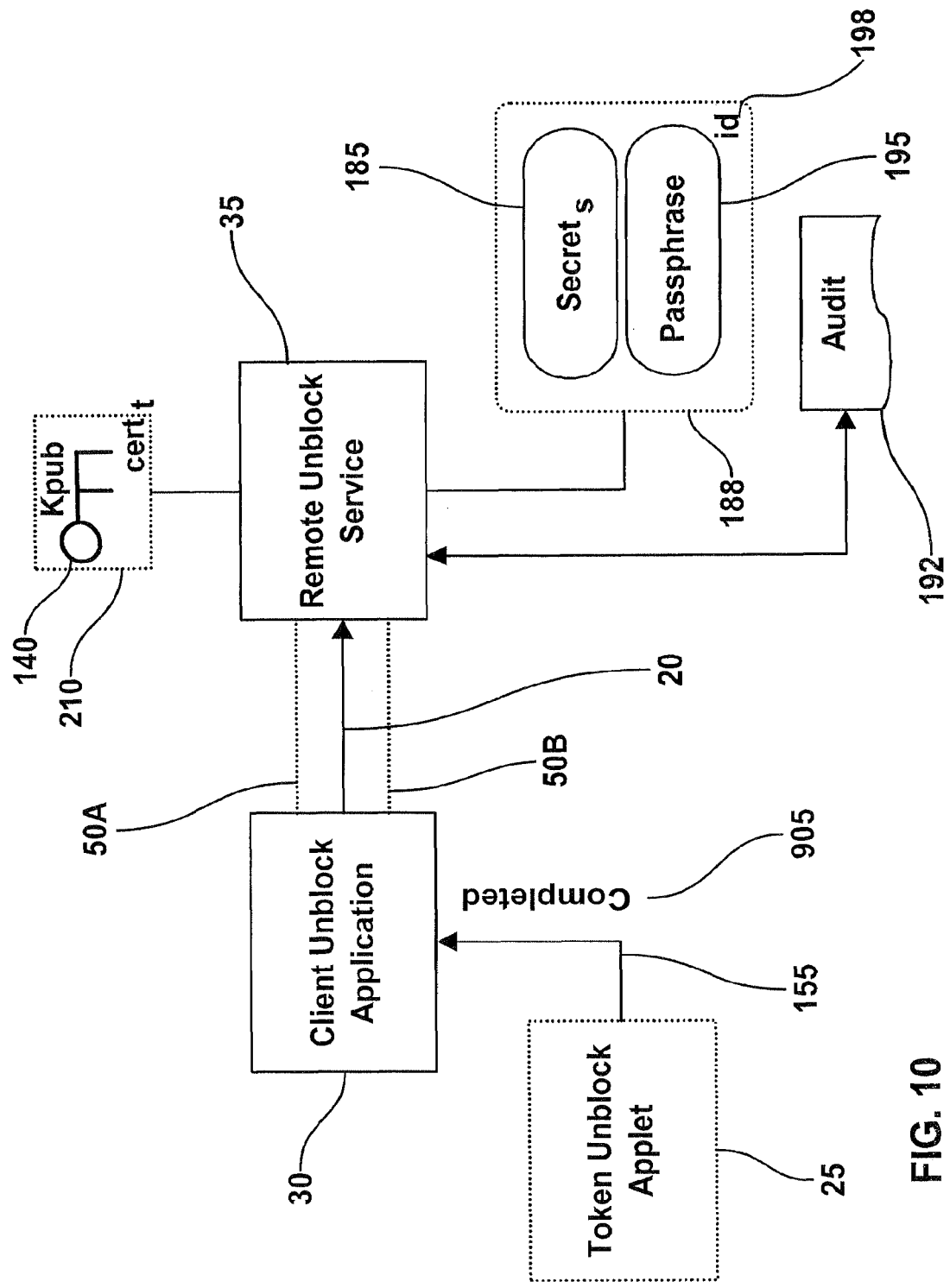
FIG. 10 is a detailed block diagram illustrating the continuation of the PIN unblock process between the local client and the remote server where the affirmative response is sent to the remote server signaling successful completion of the PIN unblock process.

In FIG. 10, the completion message 905 is then passed 20 using the secure messaging protocol 50A, 50B to the remote unblock service 35 where the audit trail 192 of the PIN unblock transactions is recorded.

Figure 11:
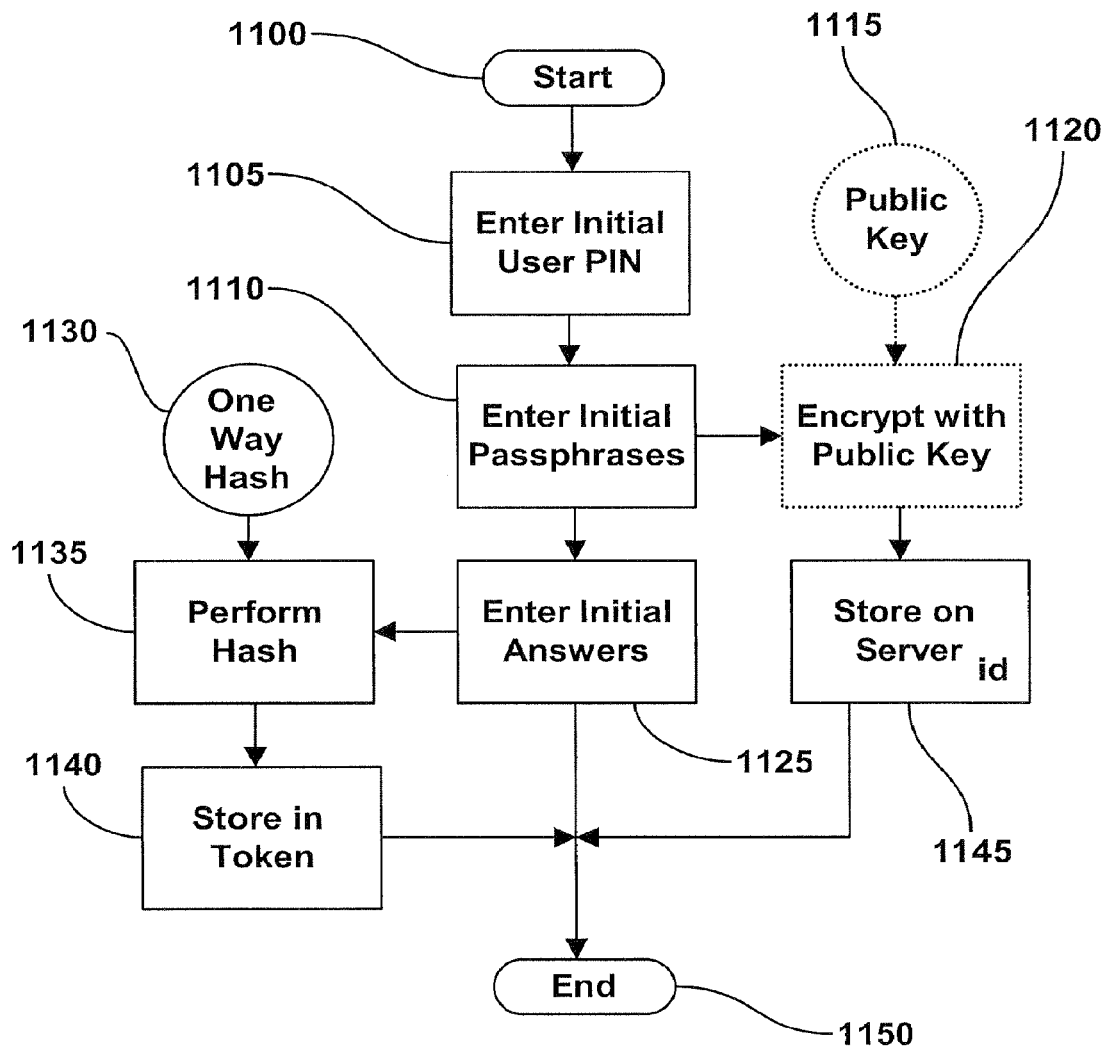
FIG. 11 is a detailed flow chart illustrating the major steps used in the invention to record and store a set of passphrases.

In FIG. 11, the initial process for generating and storing the passphrases is shown. The process is initiated 1100 by the user being prompted for a PIN 1105. The user is then prompted for entry of one or more passphrases 1110. The passphrases are then stored on a server 1145 indexed by a unique identifier associated with the security token. In an alternative embodiment of the invention, the initial passphrases are encrypted 1120 with the user's public key 1115 then stored and indexed as before 1145. The user is then prompted to enter the answers to the passphrases 1125. The answers are hashed 1135 using a one-way hash 1130 and stored inside the user's security token 1140. The process ends 1150 after storage of the hashed passphrase answers.

Figure 12:
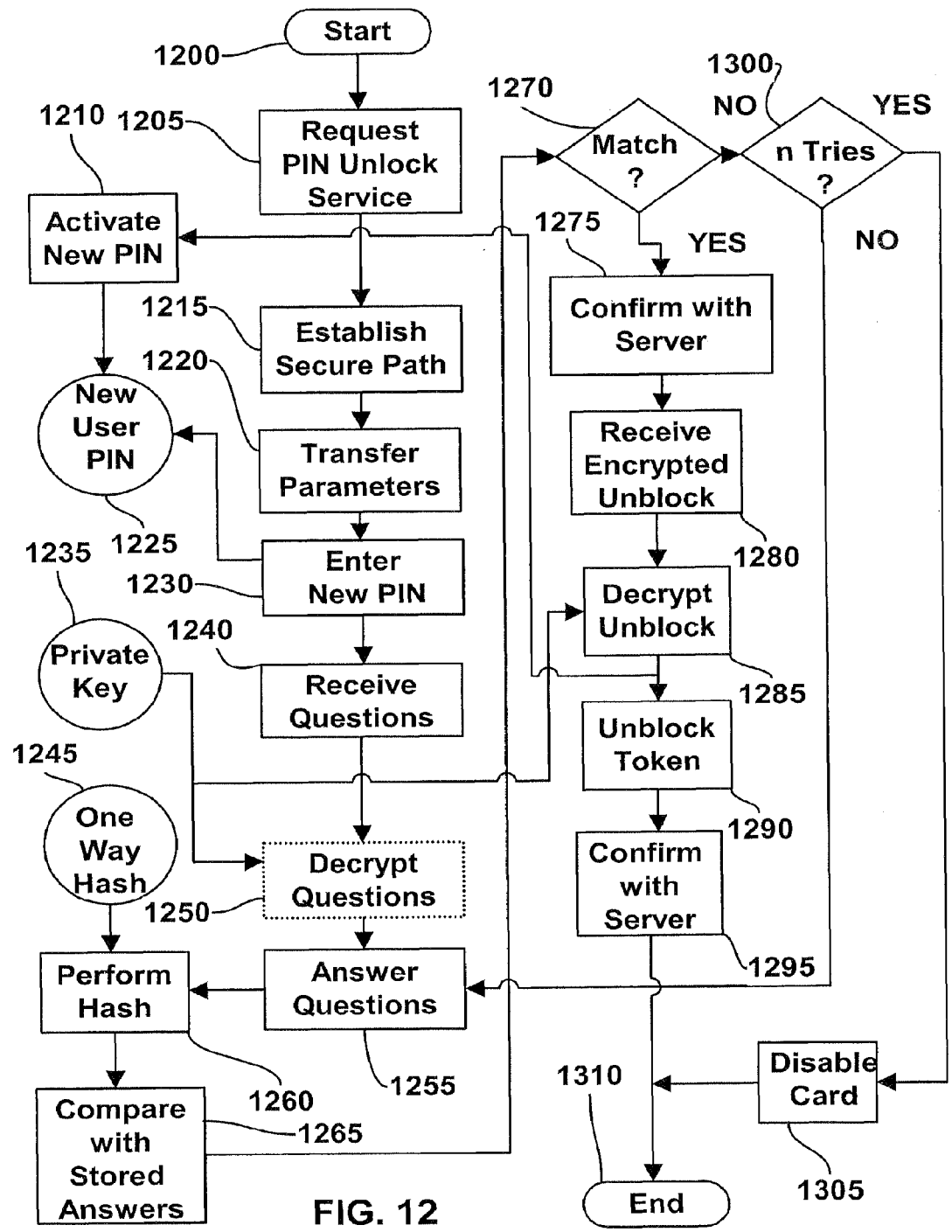
FIG. 12 is a detailed flow chart illustrating the major steps used in the invention to unblock a user's security token.

Lastly, referring to FIG. 12, the authenticated PIN unblock process is shown. The process is initiated 1200 by requesting the PIN unlock service on a appropriately equipped local client 1205. The local client performs an authentication and establishes a secure path between the local client and a remote server 1215 and transfers necessary parameters to retrieve the stored passphrases 1220. The user is then prompted to enter a new PIN 1230 while the remote server retrieves and passes the user's passphrases to the local client 1240. The passphrases are displayed and the user prompted to enter the appropriate answers 1255. In an alternate embodiment of the invention, the passphrases are decrypted 1250 using the user's private key 1235.

The user's answers are then hashed 1260 using a one-way hash algorithm 1245 and compared with the stored hashed answered 1265. If the hashed user answers match the stored hashed answers 1270, a confirmatory message is securely sent to the server 1275. The server retrieves and passes an encrypted unblock secret to the security token 1280. The encrypted unblock secret is decrypted 1285 using the private key 1235 and used to unblock the security token 1290 and the new PIN activated 1210.

Another confirmatory message is securely sent to the server 1295 for audit trail purposes and the process ends 1310. If the hashed user answers do not match the stored hashed answers 1270 and less than n attempts have occurred 1300, the user is prompted to again enter the proper passphrase as before and the process repeated. If greater than n tries has occurred, the token is disabled 1305 and processing ends 1310.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the Claims following herein.

What is claimed:

1. A system which facilitates an authenticated user to unblock a temporarily blocked security token, comprising:
   a security executive associated with said token;
   an unblock applet associated with said security executive;
   a first secret associated with at least one unblock inquiry;
   a first shared secret associated with said unblock applet; and
   a client functionally connected to said security token and including at least one client application for initiating an unblock procedure with said security token and a remote server in remote processing communication with said client, said client including:
   said at least one unblock inquiry,
   at least one unblock service application, responsive to said at least one client application, and
   a second shared secret, wherein said at least one unblock inquiry and said second shared secret are sent from said remote server via the client to said unblock applet for unblocking said security token.

2. The system according to claim 1 wherein said first secret is a one way hash of an answer to said at least one unblock inquiry.

3. The system according to claim 2 wherein said security token further includes a private asymmetric key.

4. The system according to claim 3 wherein said server further includes a public asymmetric key counterpart to said private asymmetric key.

5. The system according to claim 4 wherein said at least one unblock inquiry is encrypted with said public asymmetric key.

6. The system according to claim 1 wherein said first shared secret is equal to said second shared secret.

7. The system according to claim 5 wherein said second shared secret is encrypted with said public asymmetric key.

8. The system according to claim 7 wherein said second shared secret is an administrative PIN.

9. The system according to claim 8 wherein said second shared secret is a symmetric key.

10. The system according to claim 7 wherein said second shared secret is decrypted with said private asymmetric key.

11. The remote server according to claim 1 further including means for providing an audit trail of said unblock procedure.

12. The system according to claim 1 wherein said second shared secret is sent to said security token upon receipt of a properly encoded message by said at least one unblock service application.

13. The system according to claim 1 wherein said at least one unblock inquiry includes a passphrase.

14. The system according to claim 1 wherein said processing communications includes a secure communications protocol.

15. A method for generating and storing at least one passphrase and answers associated with said at least one passphrase to facilitate an authenticated user to unblock a temporarily blocked security token, the method comprising:
generating said at least one passphrase;
associating said at least one passphrase with a unique identifier;
storing said at least one passphrase on a server in a manner retrievable using said unique identifier;
generating said answers associated with said at least one passphrase;
performing a message digest function on said answers associated with said at least one passphrase; and
storing a result of said message digest function in a security token associated with said authenticated user, wherein the security token is used in an access attempt at a site that is remote from the server, wherein processing to unblock the security token is performed at the site using the result of the message digest function stored in the security token, and wherein said unique identifier is associated with said security token.

16. The method according to claim 15 further including the step of encrypting said at least one passphrase with a public asymmetric key associated with said security token.

17. A method which facilitates an authenticated user to unblock a temporarily blocked security token, comprising:
executing a PIN unblock application on a local client in which said security token operatively is connected;
passing a set of parameters from said security token via said PIN unblock application to a remote PIN unblock service, the remote PIN unblock service being in remote processing communication with the local client;
using at least one of said set of parameters for retrieving and locally displaying at least one passphrase from said PIN unblock service;
entering an appropriate response to said at least one passphrase;
performing a mathematical function on said appropriate response;
comparing said result of said mathematical function to an existing reference;
sending a confirmatory message to said remote PIN unblock service if said result of said mathematical function matches said existing reference or ending processing if no match is found;
retrieving an unblocking secret using said at least one of said set of parameters upon receipt of said confirmatory message;
sending said unblocking secret to said security token; and
unblocking said security token with said PIN unblock application on the local client using said unblocking secret.

18. The method according to claim 17 further including the step of using said at least one of said set of parameters to establish a secure communications channel between said remote PIN unblock service and said PIN unblock application.

19. The method according to claim 18 further including the step of entering a replacement PIN when prompted by said PIN unlock application.

20. The method according to claim 17 wherein said at least one of said set of parameters includes an authentication challenge, a unique identifier and a digital certificate.

21. A non-transitory computer readable medium containing software that provides computer executable instructions to perform the steps of:
generating user display and input dialogs;
passing a set of parameters from a security token via said PIN unblock application to a remote PIN unblock service that is in processing communication remotely with the PIN unblock application;
using at least one of said set of parameters for retrieving and locally displaying at least one passphrase from said PIN unblock service;
prompting for entry of an appropriate response to said at least one passphrase;
performing a mathematical function on said appropriate response;
comparing said result of said mathematical function to an existing reference;
sending a confirmatory message to said remote PIN unblock service if said result of said mathematical function matches said existing reference or ending processing if no match is found;
retrieving an unblocking secret using said at least one of said set of parameters upon receipt of said confirmatory message;
sending said unblocking secret to said security token; and
unblocking said security token with said PIN unblock application on the local client using said unblocking secret.

22. The computer program product according to claim 21 further including the step of using said at least one of said set of parameters to establish a secure communications channel between said remote PIN unblock service and said PIN unblock application.

23. The computer program product according to claim 22 further including the step of prompting for the entry of a replacement PIN.

24. The computer program product according to claim 21 wherein said at least one of said set of parameters includes an authentication challenge, a unique identifier and a digital certificate.

25. The computer program product according to claim 21, wherein the existing reference is stored in the security token.

26. The method according to claim 17, wherein the existing reference is stored in the security token.

* * * * *